United States Patent
Yu et al.

(10) Patent No.: US 8,882,385 B2
(45) Date of Patent: Nov. 11, 2014

(54) COMPOSITE TACK FILM

(71) Applicants: Tao Yu, Wellesley, MA (US); Fei Wang, Stoneham, MA (US)

(72) Inventors: Tao Yu, Wellesley, MA (US); Fei Wang, Stoneham, MA (US)

(73) Assignee: Saint-Gobain ADFORS Canada, Ltd., Grand Island, NY (US)

( * ) Notice: Subject to any disclaimer, the term of this patent is extended or adjusted under 35 U.S.C. 154(b) by 0 days.

(21) Appl. No.: 14/057,861

(22) Filed: Oct. 18, 2013

(65) Prior Publication Data

US 2014/0112717 A1  Apr. 24, 2014

Related U.S. Application Data

(60) Provisional application No. 61/716,043, filed on Oct. 19, 2012.

(51) Int. Cl.
  *E01C 3/00* (2006.01)
  *E01C 11/16* (2006.01)
  *E01C 7/18* (2006.01)
  *E01C 3/06* (2006.01)

(52) U.S. Cl.
  CPC .............. *E01C 11/165* (2013.01); *E01C 7/18* (2013.01); *E01C 3/06* (2013.01); *E01C 11/16* (2013.01)
  USPC ............................................... 404/31; 404/72

(58) Field of Classification Search
  CPC ............ E01C 3/06; E01C 7/18; E01C 11/165
  USPC ............. 404/17, 13, 72, 75, 76, 111; 428/212
  See application file for complete search history.

(56) References Cited

U.S. PATENT DOCUMENTS

| | | | |
|---|---|---|---|
| 3,644,130 A | 2/1972 | Evans et al. | |
| 3,870,426 A * | 3/1975 | Kietzman et al. | 404/82 |
| 3,955,997 A | 5/1976 | Sagane et al. | |
| 4,085,175 A | 4/1978 | Keuchel | |
| 4,306,591 A | 12/1981 | Arterburn | |
| 4,359,546 A | 11/1982 | Bershas | |

(Continued)

FOREIGN PATENT DOCUMENTS

| | | |
|---|---|---|
| CN | 1049998 A | 3/1991 |
| CN | 1239730 | 12/1999 |

(Continued)

OTHER PUBLICATIONS

"Release agent gives uniform gloss," Plastics Technology, Nov. 2003, 49, 11; ANI/INFORM, Trade & Industry, p. 22.

(Continued)

*Primary Examiner* — Raymond W Addie
(74) *Attorney, Agent, or Firm* — Abel Law Group, LLP; Robert N. Young

(57) ABSTRACT

A composite tack film is provided. The composite tack film includes a) a first polymer layer including a thermally conductive polymer having a melting temperature of less than about 100° C.; b) a second polymer layer adjacent the first polymer layer, the second polymer layer including a viscoelastic, thermally conductive polymer having a melting temperature of less than about 110° C.; and c) a third polymer layer adjacent the second polymer layer, the third polymer layer including a thermally insulative polymer having a melting temperature of less than about 100° C. Further included is a method of reinforcing pavement with the aforementioned composite tack film.

19 Claims, 3 Drawing Sheets

(56) References Cited

U.S. PATENT DOCUMENTS

| | | | |
|---|---|---|---|
| 4,425,399 A | 1/1984 | Bershas | |
| 4,447,500 A | 5/1984 | Ferris | |
| 4,491,617 A | 1/1985 | O'Connor et al. | |
| 4,637,946 A * | 1/1987 | Shah et al. | 428/63 |
| 4,670,490 A | 6/1987 | Yoshida et al. | |
| 4,673,616 A | 6/1987 | Goodwin | |
| 4,684,689 A | 8/1987 | Yannich et al. | |
| 4,699,542 A | 10/1987 | Shoesmith | |
| 4,722,953 A | 2/1988 | DeRuiter et al. | |
| 4,780,350 A | 10/1988 | O'Connor et al. | |
| 4,957,390 A | 9/1990 | Shoesmith | |
| 5,110,627 A | 5/1992 | Shoesmith et al. | |
| 5,246,306 A | 9/1993 | Shoesmith et al. | |
| 5,254,661 A | 10/1993 | Wilson | |
| 5,286,551 A | 2/1994 | Di Stefano et al. | |
| 5,356,466 A | 10/1994 | Lawson | |
| 5,393,559 A | 2/1995 | Shoesmith et al. | |
| 5,667,889 A | 9/1997 | Katsura et al. | |
| 5,756,214 A | 5/1998 | Waldron et al. | |
| 5,836,715 A | 11/1998 | Hendrix et al. | |
| 5,895,173 A * | 4/1999 | O'Brien et al. | 404/108 |
| 6,139,955 A | 10/2000 | Girgis | |
| 6,171,984 B1 | 1/2001 | Paulson et al. | |
| 6,359,058 B1 | 3/2002 | Clarke et al. | |
| 6,648,547 B2 | 11/2003 | Jones et al. | |
| 6,764,741 B2 | 7/2004 | Kawasumi et al. | |
| 6,897,256 B1 | 5/2005 | Dreher et al. | |
| 6,924,015 B2 | 8/2005 | Zanchetta et al. | |
| 7,008,987 B2 | 3/2006 | Okada et al. | |
| 7,163,981 B2 | 1/2007 | Kubish et al. | |
| 7,232,276 B2 | 6/2007 | Oka et al. | |
| 8,038,364 B2 | 10/2011 | Newton et al. | |
| 8,303,211 B2 * | 11/2012 | Wang et al. | 404/76 |
| 8,349,431 B2 | 1/2013 | Lee et al. | |
| 2001/0031594 A1 | 10/2001 | Perez et al. | |
| 2003/0215286 A1 * | 11/2003 | Takamura | 404/17 |
| 2003/0224141 A1 | 12/2003 | Maupetit et al. | |
| 2004/0077761 A1 | 4/2004 | Aranguiz | |
| 2005/0139124 A1 | 6/2005 | Ito et al. | |
| 2005/0245686 A1 | 11/2005 | Stevens et al. | |
| 2005/0271888 A1 | 12/2005 | Moncla et al. | |
| 2006/0172638 A1 | 8/2006 | Chabal | |
| 2006/0292367 A1 | 12/2006 | Seol et al. | |
| 2007/0141241 A1 * | 6/2007 | Blacklidge | 427/138 |
| 2007/0253773 A1 | 11/2007 | Huang et al. | |
| 2009/0061221 A1 | 3/2009 | Lee | |
| 2009/0097917 A1 * | 4/2009 | Newton et al. | 404/70 |
| 2009/0098330 A1 | 4/2009 | Lee et al. | |
| 2010/0283072 A1 | 11/2010 | Kazlas et al. | |
| 2012/0003889 A1 | 1/2012 | Newton et al. | |
| 2013/0175902 A1 * | 7/2013 | Abu Al-Rubb | 310/339 |
| 2014/0037377 A1 | 2/2014 | Lee | |

FOREIGN PATENT DOCUMENTS

| | | |
|---|---|---|
| CN | 1821325 | 8/2006 |
| CN | 100999893 | 7/2007 |
| DE | 19543991 A1 | 5/1997 |
| DE | 102004015329 A1 | 10/2005 |
| DE | 202005002794 U1 | 7/2006 |
| EP | 0868999 B1 | 6/2004 |
| EP | 1693517 A2 | 4/2007 |
| EP | 1453994 B1 | 5/2007 |
| JP | 03-17034 A | 1/1991 |
| JP | 05-125733 | 5/1993 |
| JP | 06-115977 | 4/1994 |
| JP | 06-046941 U | 6/1994 |
| JP | 07-138910 | 5/1995 |
| JP | 2001-138420 | 5/2001 |
| JP | 2002-235047 A | 8/2002 |
| JP | 2006249674 | 9/2006 |
| JP | 2009-002092 | 1/2009 |
| KR | 10-06690979 B1 | 1/2007 |

OTHER PUBLICATIONS

Archer, Stephen, "Tensar International Expands Pavement Reinforcement Product Line: company Adds GlasPave Waterproof Paving Mat, New from Saint-Gobain Technical Fabrics," Mar. 14, 2008, Tensar International Press Release.

Dictionary.com, Definition of "film," retrieved Jul. 29, 2011.

Office Action dated Aug. 3, 2011, in related U.S. Appl. No. 12/186,263.

Office Action dated Jul. 2, 2011, in related U.S. Appl. No. 12/186,247.

Office Action Nov. 10, 2010 for corresponding Australian Application No. 2008283894.

Office Action of Feb. 2, 2011 in U.S. Appl. No. 12/186,247, 6 pages.

Office Action of Mar. 31, 2011 in U.S. Appl. No. 12/186,263, 11 pages.

Office Action Sep. 1, 2010 for corresponding Australian Application No. 2008283888.

Owens Corning, "TruPave Engineered Paving Mat," http://www.owenscorning.com/trupave/, Printed Jun. 23, 2008.

PCT Search Report mailed on Feb. 10, 2009 for PCT/US2008/072339 (Fled Aug. 6, 2008). KIPO.

PCT Search Report mailed on Jan. 30, 2009 for PCT/US08/72353 (Filed Aug 6, 2008) KIPO.

PCT Search Report mailed on Jan. 30, 2009 for PCT/US2008/072347 (Filed Aug. 6, 2008). KIPO.

Saint-Gobain Techincal Fabrics "NEW from Saint-Gbain: GlasPave 25," Copyright Oct. 2007.

Saint-Gobain Technical Fabrics "About: Products: GlasGrid Pavement Reinformcement Grid," http://www.glassgrid.com/Products/, Printed Nov. 16, 2005.

Saint-Gobain Technical Fabrics "Glasgrid Technical Manual: Advanced fiber glass technology for asphalt pavement," Copyright Sep. 2002.

Saint-Gobain Technical Fabrics "Lamination" http://www.sgtf.com/Home/Products/Technology/Tbamilex/, Printed Oct. 29, 2008.

Saint-Gobain Technical Fabrics, "Laid Scrim" http://www.sgtf.com/HomeProducts/Technology/Tbamilex/, Printed Oct. 29, 2008.

International Search Report for PCT/US2013/065693 dated Jan. 22, 2014, 4 pgs.

U.S. Appl. No. 12/186,247, filed Aug. 5, 2008 Inventors: Sugjoon Lee, et al.

U.S. Appl. No. 12/186,263, filed Aug. 5, 2008 Inventors: Sugjoon Lee.

U.S. Appl. No. 13/963,152, filed Aug. 9, 2013 Inventors: Sugjoon Lee.

U.S. Appl. No. 12/186,222, filed Aug. 5, 2008, Inventors: Mark J. Newton, et al.

U.S. Appl. No. 13/232,250, filed Sep. 14, 2011, Inventors: Mark J. Newton, et al.

* cited by examiner

COMPOSITE TACK FILM

CROSS-REFERENCE TO RELATED APPLICATION

The present application claims priority from U.S. Provisional Patent Application No. 61/716,043, filed Oct. 19, 2012, entitled "COMPOSITE TACK FILM," naming inventors Tao Yu and Fei Wang, which application is incorporated by reference herein in its entirety.

FIELD OF THE DISCLOSURE

The present disclosure relates to a composite tack film and a method of reinforcing pavement therewith.

BACKGROUND

Various methods and composites for reinforcing asphaltic roads and overlays have been proposed. Some describe fiberglass grids impregnated with resins. To repair an old pavement, an asphaltic tack coat is generally applied with fiberglass grids according to construction regulations. The tack coat is applied as a liquid (for example, as an emulsion or hot asphalt cement binder by spraying), and thereafter changes from a liquid to a solid. The tack coat is applied on top of the installed grid with an adhesive coating on the back of the grid, used as an aid in bonding a new asphalt payment to the existing pavement surface. In order to install fiberglass grids without adhesive coating on the back of the grid, the tack coat is firstly applied to an existing pavement. Before the tack coat is fully cured, the grid is laid on the tack coat. As the tack coat cures further, it holds the grid in place on the underlying pavement. The tack coat partially dissolves and merges with the impregnating resin in the grid, when hot asphalt concrete is overlaid on top of the grid. Tack coats have several highly desirable features for use with such reinforcements. In particular, they are compatible with the asphaltic concrete or cement to be used as the overlay, and their fluid nature makes them flow into, and smooth out, rough paving surfaces.

On the other hand, tack coats present several difficulties. The properties of tack coats are very sensitive to ambient conditions, particularly temperature, and humidity. These conditions may affect cure temperature of emulsion tack coats, and in severe conditions, they can prevent cure. In less severe circumstances, the overlay paving equipment must wait until the tack coat has cured, causing needless delays. For example, tack coats are normally emulsions of asphalt in water, often stabilized by a surfactant. To manifest their potential, the emulsion must be broken and water removed prior to lay down a film of asphalt. The water removal process is, essentially, evaporation, which is controlled by time, temperature, and humidity of the environment. Frequently, the environmental conditions are unfavorable, resulting in inefficient tacking or unacceptable delay.

U.S. Pat. No. 8,038,364 describes a tack film that can be used in conjunction with a reinforcing grid to repair asphaltic pavement. The reinforcing grid and tack film is laid over a base layer and a heated asphalt material is laid on top of the film. The tack film may include a polyethylene core with a resinous coating of, for example, an ethylene vinyl acetate. The tack film is softened and melted into a single body by the heat of the asphalt material. However, the film does not melt adequately unless the asphalt is applied at a temperature of greater than 285° F. While conventional hot asphalt mix is required to a temperature of 250° F. and above, the tack film fails to melt and adhesively bond to asphalt at temperatures less than 285° F.

Accordingly, there remains a desire to improve the adhesive bond between pavement courses and in particular, at low temperature paving conditions.

SUMMARY

In an embodiment, a composite tack film is provided. The composite tack film includes a) a first polymer layer including a thermally conductive polymer having a melting temperature of less than about 100° C.; b) a second polymer layer adjacent the first polymer layer, the second polymer layer including a visco-elastic, thermally conductive polymer having a melting temperature of less than about 110° C.; and c) a third polymer layer adjacent the second polymer layer, the third polymer layer including a thermally insulative polymer having a melting temperature of less than about 100° C.

In another embodiment, a method of reinforcing paving is provided. The method includes providing a reinforcing grid over a lower layer of paving; applying a composite tack coating over the reinforcing grid, wherein the composite tack coating includes a) a first polymer layer including a thermally conductive polymer having a melting temperature of less than about 100° C.; b) a second polymer layer adjacent the first polymer layer, the second polymer layer including a visco-elastic, thermally conductive polymer having a melting temperature of less than about 110° C.; and c) a third polymer layer adjacent the second polymer layer, the third polymer layer including a thermally insulative polymer having a melting temperature of less than about 100° C. The method further includes applying an upper layer of paving on the first polymer layer of the composite tack film.

BRIEF DESCRIPTION OF THE DRAWINGS

Embodiments are illustrated by way of example and are not limited in the accompanying figures.

Figure 1:
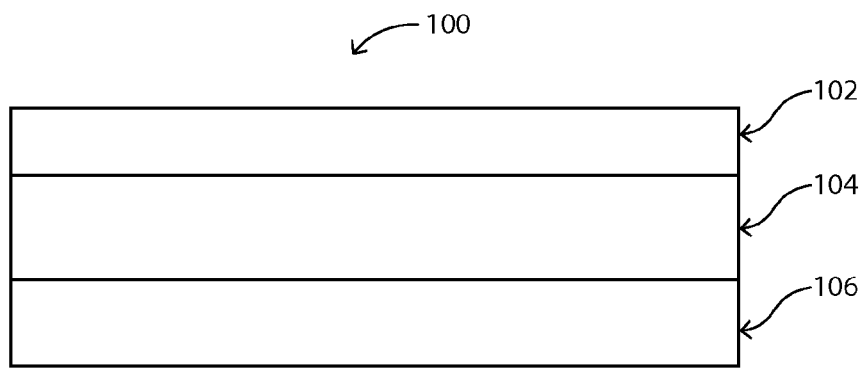
FIG. 1 includes a cross-sectional illustration of a composite tack film in accordance with an embodiment described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

Before addressing details of the embodiments described below, some terms are defined or clarified. As used herein, the terms "comprises", "comprising", "includes", "including", "has", "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

This description of the exemplary embodiments is intended to be read in connection with the accompanying drawings, which are to be considered part of the entire written description. In the description, relative terms such as "lower", "upper", "horizontal", "vertical", "above", "below", "up", "down", "top" and "bottom" as well as derivative thereof (e.g., "horizontally", "downwardly", "upwardly", etc.) should be construed to refer to the orientation as then described or as shown in the drawing under discussion. These relative terms are for convenience of description and do not require that the apparatus be constructed or operated in a particular orientation.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The present invention provides a composite tack film. The composite tack film includes a) a first polymer layer including a thermally conductive polymer having a melting temperature of less than about 100° C. (212° F.); b) a second polymer layer adjacent the first polymer layer, the second polymer layer including a visco-elastic, thermally conductive polymer having a melting temperature of less than about 110° C. (230° F.); and c) a third polymer layer adjacent the second polymer layer, the third polymer layer including a thermally insulative polymer having a melting temperature of less than about 100° C. The composite tack film is typically used with paving. "Paving" as used herein refers to roads, roadways, and surfaces and includes airports, sidewalks, driveways, parking lots and all other such paved surfaces. The composite tack film as described has a desirable thermal melting and adhesive behavior for paving applications compared to conventionally available tack films. More particularly, each layer of the composite tack film is designed to provide melting and enhanced adhesion compared to conventionally available tack films. In particular, the composite tack film provides melting and enhanced adhesion to asphalt at temperatures less than about 300° F., such as temperatures of about 250° F. to about 285° F. Exemplary advantageous properties of the composite tack film can be seen in the subsequent description and Examples.

The composite tack film includes a first polymer layer. In an embodiment, the first polymer layer is a thermally conductive polymer. In a particular embodiment, the thermally conductive polymer for the first polymer layer has a melting temperature of less than about 100° C. Any thermally conductive polymer having a melting temperature of less than about 100° C. is envisioned. For instance, the thermally conductive polymer includes an elastomeric polar polymer. In an embodiment, the elastomeric polar polymer is a semi-crystalline or a crystalline polymer. "Crystalline" as used herein refers to a polymer that has a distinct melting temperature, as opposed to an amorphous polymer, i.e. with no crystalline melting point.

Any elastomeric polar polymer for the first polymer layer is envisioned. An exemplary elastomeric polar polymer is an ethylene vinyl acetate (EVA) copolymer. The amount of vinyl acetate found in the ethylene vinyl acetate copolymer determines the crystallinity of the polymer. In particular, the lower the percentage of vinyl acetate in the ethylene vinyl acetate copolymer, the higher the crystalline regularity of the ethylene chain. Furthermore, the higher the percentage of vinyl acetate in the ethylene vinyl acetate copolymer, the lower the melting temperature of the resulting ethylene vinyl acetate copolymer. A semi-crystalline and a crystalline polymer typically has a vinyl acetate content of less than about 50% by weight, based on the total weight of the ethylene vinyl acetate copolymer. Accordingly, it is advantageous for the percentage of the vinyl acetate for each polymer layer of the composite tack film to be balanced to provide the desired melt temperature properties.

In an embodiment, the ethylene vinyl acetate copolymer of the first polymer layer has a vinyl acetate content of less than about 50% by weight, such as less than about 40% by weight, based on the total weight of the ethylene vinyl acetate copolymer. In a particular embodiment, the ethylene vinyl acetate copolymer of the first polymer layer is about 10% by weight to about 40% by weight, such as about 10% by weight to about 30% by weight, or even about 15% by weight to about 25% by weight, based on the total weight of the ethylene vinyl acetate copolymer.

The first polymer layer further includes an additive to provide thermal conductive properties. Any reasonable additive is envisioned, such as a filler. Any filler is envisioned that is compatible with asphalt. In particular, the filler provides thermally conductive properties and dissipates heat through the first polymer layer to the second polymer layer. In an embodiment, the filler has a thermal conductivity of at least about 2.2 W/mK, such as at least about 2.4 W/mK, such as at least about 2.7 W/mK, or even greater than about 3.0 W/mK. Exemplary fillers include calcium carbonate, talc, a glass fiber, marble dust, cement dust, clay feldspar, silica or glass, fumed silica, alumina, magnesium oxide, magnesium hydroxide, antimony oxide, zinc oxide, barium sulfate, aluminum silicate, calcium silicate, titanium dioxide, a titanate, a glass microsphere, an inorganic particle with a metal coating, chalk, reflective filler such as metal flakes, or any combination thereof. In an exemplary embodiment, the filler is chemically compatible to asphalt binder, which is predominately bitumen, as the film eventually melts and expose these fillers to the bulk of asphalt. In an embodiment, the filler is calcium carbonate, talc, an inorganic particle with a metal coating, carbon black, or combination thereof. In a particular embodiment, the filler is calcium carbonate. Any particle size for the filler is envisioned. In an embodiment, the average diameter of the particle is not greater than about 20 mm, such as about 1 mm to about 10 mm.

Typically, the amount of filler in the first polymer layer is dependent upon the thermal conductive properties desired and the filler chosen. For instance, the filler is typically present in the first polymer layer at an amount of up to about 50% by weight, such as up to about 40% by weight, or even up to about 30% by weight, based on the total weight of the first polymer layer. In an embodiment, the filler is present at an amount of at least about 1% by weight, such as at least about 5% by weight, or even at least about 10% by weight, based on the total weight of the first polymer layer. In a particular embodiment, the filler is present at an amount of about 1% by weight to about 50% by weight, such as about 5% by weight to about 40% by weight, or even about 10% by weight to about 30% by weight, based on the total weight of the first polymer layer.

The composite tack film further includes a second polymer layer that is adjacent to the first polymer layer. In a particular embodiment, the second polymer layer is in direct contact with the first polymer layer. The second polymer layer includes a visco-elastic, thermally conductive polymer having a melting temperature of less than about 110° C. Any reasonable visco-elastic, thermally conductive polymer having a melting temperature of less than about 110° C. is envisioned. In an embodiment, the visco-elastic, thermally conductive polymer is a polymer blend of an elastomeric polar polymer and a thermoplastic polymer. The ratio of the blend of the components is dependent upon the elastomeric polar polymer chosen, the thermoplastic polymer chosen, and the final properties desired for the second polymer layer.

Any elastomeric polar polymer is envisioned for the second polymer layer. An exemplary elastomeric polar polymer is an ethylene vinyl acetate copolymer. In a particular embodiment, the elastomeric polar polymer is semi-crystalline or crystalline. For instance, the ethylene vinyl acetate copolymer of the second polymer layer has a vinyl acetate content of less than about 50% by weight, such as less than about 40% by weight, based on the total weight of the ethylene vinyl acetate copolymer. In a particular embodiment, the ethylene vinyl acetate copolymer of the second polymer layer is about 15% by weight to about 50% by weight, such as about 15% by weight to about 40% by weight, or even about 15% by weight to about 30% by weight, based on the total weight of the ethylene vinyl acetate copolymer. In an embodiment, the ethylene vinyl acetate copolymer of the second polymer layer has a vinyl acetate content greater than the ethylene vinyl acetate copolymer of the first polymer layer. The second polymer layer with a higher vinyl acetate content has a lower melting point compared to the first polymer layer. The lower melting point of the ethylene vinyl acetate copolymer of the second polymer layer may provide an improved bonding strength of the composite tack film.

To provide desirable visco-elastic properties to the second polymer layer having the softened and lower melting ethylene vinyl acetate copolymer, the ethylene vinyl acetate copolymer is blended with the thermoplastic polymer. In an embodiment, the thermoplastic polymer for the second polymer layer substantially provides the visco-elastic properties to the second polymer layer. Any reasonable thermoplastic polymer is envisioned. In an exemplary embodiment, the thermoplastic polymer of the second polymer layer is a polyolefin. The polyolefin desirably withstands a certain amount of shear when subjected to compressive forces during the paving process, such as when asphalt is compressed thereon, but maintains its adhesive strength. For instance, this would then favor a polymer with melt rheological properties that is steady under shear conditions. Some polymers, for example linear low density polyethylene (LLDPE), exhibits more "stiff in shear" rheology behavior which may be detrimental to bonding and may not be as desirable for the described application in this aspect compared to a less "stiff in shear" low density polyethylene (LDPE). In a particular embodiment, the polyolefin has a desirable melting temperature, such as less than about 120° C.

A typical polyolefin may include a homopolymer, a copolymer, a terpolymer, an alloy, or any combination thereof formed from a monomer, such as ethylene, propylene, butene, pentene, methyl pentene, octene, or any combination thereof. An exemplary polyolefin includes high density polyethylene (HDPE), medium density polyethylene (MDPE), low density polyethylene (LDPE), ultra or very low density polyethylene (VLDPE), linear low density polyethylene (LLDPE), ethylene propylene copolymer, ethylene butene copolymer, polypropylene (PP), polybutene, polybutylene, polypentene, polymethylpentene, polystyrene, ethylene propylene rubber (EPR), ethylene octene copolymer, blend thereof, mixture thereof, and the like. In a particular example, the polyolefin includes polyethylene, such as low density polyethylene, linear low density polyethylene (LLDPE), or blends thereof. The polyolefin further includes olefin-based random copolymers, olefin-based impact copolymers, olefin-based block copolymers, olefin-based specialty elastomers, olefin-base specialty plastomers, blends thereof, mixture thereof, and the like.

In an embodiment, the thermoplastic polymer, such as polyolefin, may be provided in any reasonable amount to provide desirable properties, such as visco-elasticity, to the second polymer layer. For instance, the polyolefin and amount are chosen to provide desirable adhesive and rheological behavior when under melt conditions. Typically, the polyolefin is present from at least about 20% by weight, such as about 30% by weight to about 60% by weight, based on the total weight of the second polymer layer.

In an exemplary embodiment, the second polymer layer includes an additive to provide thermally conductive properties to the second polymer layer. The additive is mixed with the blend of the ethylene vinyl acetate copolymer and the polyolefin. In an embodiment, the additive is a filler. Any filler is envisioned that is compatible with asphalt. In particular, the filler provides thermally conductive properties and dissipates heat through the second polymer layer to the third polymer layer. In an embodiment, the filler has a thermal conductivity of at least about 2.2 W/mK, such as at least about 2.4 W/mK, such as at least about 2.7 W/mK, or even greater than about 3.0 W/mK. Exemplary fillers include the fillers described for the first polymer layer. In a particular embodiment, the filler for the second polymer layer is calcium carbonate, talc, an inorganic particle with a metal coating, carbon black, or combination thereof. In a more particular embodiment, the filler for the second polymer layer is calcium carbonate.

Typically, the amount of filler in the second polymer layer is dependent upon the thermal conductive properties desired and the filler chosen. For instance, the filler is typically present at an amount of up to about 50% by weight, such as up to about 40% by weight, or even up to about 30% by weight, based on the total weight of the second polymer layer. In an embodiment, the filler is present at an amount of at least about 1% by weight, such as at least about 5% by weight, or even at least about 10% by weight, based on the total weight of the second polymer layer. In a particular embodiment, the filler is present at an amount of about 1% by weight to about 50% by weight, such as about 5% by weight to about 40% by weight, or even about 10% by weight to about 30% by weight, based on the total weight of the second polymer layer.

The composite tack film further includes a third polymer layer adjacent to the second polymer layer. In a particular embodiment, the third polymer layer is in direct contact with the second polymer layer. Typically, the third polymer layer includes a thermally insulative polymer having a melting temperature of less than about 100° C. Any thermally insulative polymer having a melting temperature of less than about 100° C. is envisioned for the third polymer layer. In an embodiment, the thermally insulative polymer is an elastomeric polar polymer.

Any elastomeric polar polymer is envisioned for the third polymer layer. In an embodiment, the elastomeric polar polymer of the third polymer layer is ethylene vinyl acetate copolymer. In an embodiment, the ethylene vinyl acetate copolymer is semi-crystalline or crystalline. For instance, the ethylene vinyl acetate of the third polymer layer has a vinyl acetate content of less than about 50% by weight, such as less than about 40% by weight, based on the total weight of the ethylene vinyl acetate copolymer. In a particular embodiment, the ethylene vinyl acetate copolymer of the third polymer layer is about 10% by weight to about 40% by weight, such as about 10% by weight to about 30% by weight, or even about 15% by weight to about 25% by weight, based on the total weight of the ethylene vinyl acetate copolymer. In a more particular embodiment, the vinyl acetate content for the third polymer layer is less than the vinyl acetate content of the second polymer layer. This may provide desirable tack for the third polymer layer while maintaining its melting properties.

In an exemplary embodiment, the thermally insulative polymer of the third polymer layer is substantially free of any filler or any other components, such as polymers, additives, and the like. For instance, the thermally insulative polymer of the third polymer layer may be substantially free of a filler that provides thermal conductivity. "Substantially free" as used herein refers to less than about 0.1 wt %, or even less than about 0.01 wt %, based on the total weight % of the third polymer layer. In a more particular embodiment, the third polymer layer is thermally insulative to maintain the heat within the composite tack film to provide desirable melting of the composite tack film during an asphalt application.

The composite tack film may further include any reasonable additives in addition to the components described to any of the layers, such as, for example, a polymer, ammonia, a thickener, a pigment such as carbon black, a defoamer, and a plasticizer, or any combination thereof. In another embodiment, any of the layers of composite tack film may be substantially free of any additives in addition to the components described. "Substantially free" as used herein refers to less than about 0.1 wt %, or even less than about 0.01 wt %, based on the total weight % of the layer.

The composite tack film may be used for asphaltic applications. For instance, the composite tack film may be used to repair and reinforce paving. In an embodiment, the composite tack film may be used as to provide an adhesive bond between asphaltic layers. In an exemplary embodiment, the composite tack film may be used in conjunction with a reinforcing layer, such as a reinforcing grid. A method of repairing paving includes providing a reinforcing grid over a lower layer of paving. In a particular embodiment, the reinforcing grid is in direct contact with the lower layer of paving. Typically, the lower layer of paving is an existing pavement, which can be concrete, asphalt, or a mixture thereof. Overlying the reinforcing grid is the composite tack film as described above. In a particular embodiment, the composite tack film is disposed directly on the reinforcing grid. Typically, the composite tack film may be applied by any reasonable means such as by rolling the composite tack film over the reinforcing grid. The third polymer layer is typically directly in contact with the reinforcing grid. An upper layer of paving is then applied on the composite tack film, such as the first polymer layer of the composite tack film. Typically, the upper layer of paving is asphalt. In a particular embodiment, the upper layer has a thickness of at least about 1.5 inches (40 mm).

Once the upper layer is applied, the composite tack film is activated at a paving temperature, pressure, or both, to form the adhesive bond compatible with the asphaltic paving. In an embodiment, the activation temperature is at a temperature of less than about 300° F., such as at a temperature of about 250° F. to about 285° F. Due to the thermal conductivity of the first polymer layer and the second polymer layer, the heat of the application of hot asphalt dissipates to the third polymer layer which melts the three layers of the composite tack film. In particular, the layers of the composite tack film plastically flow to provide an adhesive bond to the reinforcing grid, the lower asphaltic layer and the upper asphaltic layer. The shear strength in a four inch puck, including the grid, the lower asphaltic layer, and the upper asphaltic layer is at least about 1 kN, such as at least about 2 kN, or even greater than about 5 kN.

As stated, the composite tack film may be used in conjunction with a reinforcing layer. In an embodiment, any reasonable configuration of the reinforcing layer is envisioned. The reinforcing layer includes any reasonable reinforcing material envisioned. For instance, a reasonable reinforcing material includes continuous filament glass fibers, though other high modulus fibers, such as polyethylene terephthalate, known as polyester or PET, and polyamide fibers of poly(p-phenylene terephthalamide), known as Kevlar®, may be used.

In an embodiment, the reinforcing layer is a reinforcing grid that includes two sets of strands oriented in any reasonable orientation. For instance, the first set of strands run in one direction and the second set of strands run in a second direction. In an embodiment, the reinforcing grid includes a first set of strands running lengthwise in long lengths and approximately parallel with the second set of strands running perpendicular to the first set of strands. In a particular embodiment, the first set of strands and the second set of strands provide openings between the strands and their intersection points. In an exemplary embodiment, the openings permit asphalt to encapsulate each strand of the reinforcing layer completely, and permit complete and substantial contact between the composite tack film and an upper asphaltic layer and a lower asphaltic layer. The composite tack film substantially bonds the lower asphalt layer and the upper asphalt layer through the openings of the reinforcing grid to permit substantial transfer of stresses from the lower asphalt layer and the upper asphalt layer to the strands of the reinforcing layer.

In an embodiment, the reinforcing layer may include any means to fix the strands at their intersection points. For instance, the means to fix the strands include thread at intersections, an adhesive, or combination thereof. Not to be bound by theory, the fixed strands provide strength to the reinforcement layer by permitting forces parallel to one set of strands to be transferred, in part, to another set of parallel strands. In a particular embodiment, the reinforcing layer may further include any reasonable coating to form a bond compatible with asphaltic paving. A reasonable coating includes a resin, such as a thermoplastic resin. In a particular embodiment, the reinforcing layer is "pre-impregnated" with the resin. For instance, the viscosity of the resin is selected so that it penetrates into the strands of the reinforcing layer. The coating of the resin is generally uniformly spread across the interior of the strand to impart a semi-rigid nature to the strand, and cushion and protect the strands from corrosion by water, salt, oil and other elements in the roadway environment. The impregnation also reduces abrasion between glass strands and the cutting of one glass strand by another. The resulting composite tack film and reinforcing layer has a high modulus and a high strength to cost ratio with its coefficient of expansion approximating that of road construction materials. Accordingly, the reinforcing layer and composite tack film have properties such as desirable flex fatigue, wear, strength, adhesion to asphalt, and the like.

The reinforcing layer may have a minimum strength of about 25 kN per meter (kN/m) in the direction of each set of parallel strands, such as about 50 kN/m, or even about 100 kN/m or more, with less than about 10%, or even less than 5% elongation at break. In some embodiments, the reinforcing layer may be a fiberglass GlasGrid® product (e.g., 8550, 8501, 8502, 8511 or 8512 grid), available from Saint-Gobain ADFORS.

Turning to FIG. 1, an exemplary composite tack film 100 is illustrated. The composite tack film 100 includes a first polymer layer 102. The first polymer layer 102 includes a thermally conductive polymer having a melting temperature of less than about 100° C. Adjacent to the first polymer layer 102 is a second polymer layer 104. As illustrated, the second polymer layer 104 directly contacts first polymer layer 102. The second polymer layer 104 includes a visco-elastic, thermally conductive polymer having a melting temperature of less than about 100° C. A third polymer layer 106 is disposed adjacent the second polymer layer 104. As illustrated, the third polymer layer 106 directly contacts the second polymer layer 104. The third polymer layer 106 includes a thermally insulative polymer having a melting temperature of less than about 100° C. Although not illustrated, the composite tack film 100 may further include an optional release liner, an optional release coating, or any combination thereof. In a particular embodiment, the release liner may be provided on any reasonable surface of the composite tack film 100, such as the first polymer layer 102. Any reasonable release liner, release coating, or combination thereof is envisioned for ease of handling. In particular, the release liner, release coating, or combination thereof may prevent a surface of the composite tack film 100 from adhering to another surface prior to application to a paving surface. For instance, the composite tack film 100 is typically stored and transported in a wound state and in a particular embodiment, the release liner, release coating, or combination thereof provides ease of handling as the composite tack film 100 is unwound. In an embodiment, any release coating may be envisioned, such as a liquid release coating having any suitable thickness or composition for its intended purpose. In an embodiment, a release liner is used, the release liner including any suitable material, dimensions, or forms that enable the release liner to be removed easily and manually without altering the physical or functional properties of the composite tack film 100.

The composite tack film 100 has any thickness envisioned. For instance, each polymer layer 102, 104, and 106 may have a thickness of about 0.5 mil to about 5.0 mil, such as about 0.5 mil to about 4.0 mil, or even about 0.5 mil to about 2.0 mil. In an embodiment, the thickness of each layer may be the same or different. In a particular embodiment, the second polymer layer may have a thickness that is greater than the first polymer layer and the third polymer layer. Typically, the composite tack film 100 has a total thickness of not greater than about 10.0 mil, such as not greater than about 5.0 mil, or even not greater than about 2.0 mil.

Figure 2:
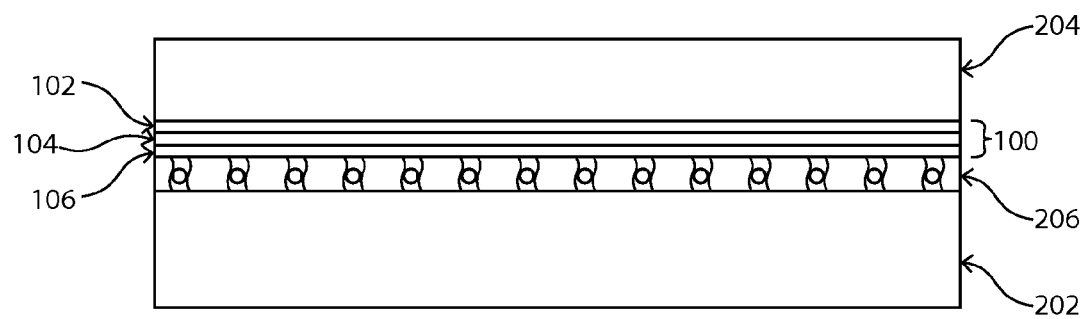
FIG. 2 includes a partial cross-sectional illustration of a repaved section of asphaltic pavement according to an embodiment described herein.

As illustrated in FIG. 2, the composite tack film 100 is used in conjunction with asphaltic paving 200. For instance, the composite tack film 100 may be disposed between a lower layer 202 of an asphaltic surface and an upper layer 204 of an asphaltic surface. In a particular embodiment, the lower asphaltic layer 202 is an existing road surface. In an exemplary embodiment, between the lower asphaltic layer 202 and the composite tack film 100 is a reinforcing layer 206, such as a reinforcing grid. In a particular embodiment, the reinforcing layer 206 directly contacts the lower asphaltic layer 202. As illustrated, the composite tack film 100 directly contacts the reinforcing layer 206. As stated earlier, the third polymer layer 106 of the composite tack film 100 directly contacts the reinforcing layer 206. The upper layer 204 of an asphaltic surface is applied over the composite tack film 100. As illustrated, the upper asphaltic layer 204 is applied to the thermally conductive first polymer layer 102 of the composite tack film 100. Any number of composite tack films 100 may be used within the asphaltic paving 200. Although not illustrated, the composite tack film 100 may be present between the reinforcing layer 206 and the lower layer 202 with or without the composite tack film 100 present between the upper asphaltic layer 204 and the reinforcing layer 206.

The composite tack film has desirable properties for a tack film when used with asphaltic applications, such as for the maintenance and repair of existing road surfaces. Desirably the component layers of the composite tack film can be transported and applied with ease. The composite tack films are not tacky at ambient conditions and have stability in storage and shipping environments. "Ambient" as used herein refers to the surrounding environmental conditions, such as pressure, temperature, or relative humidity. In addition, the composite tack film is semi-rigid, and can be rolled-up for easy transport as a prefabricated, continuous component to the place of installation, where it may be readily rolled out continuously for rapid, economical, and simple incorporation into the roadway.

Further, the combination of polymer layers provides a composite tack film with enhanced properties compared to conventionally available tack films. For instance, the ethylene vinyl acetate copolymer having the vinyl acetate content as described for the first polymer layer and the third polymer layer enhances the resistance of the composite tack film to ambient temperatures, whereas the higher vinyl acetate content ethylene vinyl acetate copolymer second polymer layer provides the composite tack film with enhanced bonding strength. The viscoelastic properties of the second polymer layer are then enhanced by blending the ethylene vinyl acetate copolymer with the polyolefin, selected also for its melting property. The use of the filler in the first polymer layer and the second polymer layer further provides desirable melt behavior for the composite tack film. Advantageously, the combination of the low melt films with the fillers provides an improved adhesive bond to asphaltic surfaces compared to conventionally available tack films. Further the improved adhesive bond is possible at lower application temperatures compared to conventionally available tack films. Desirably, the composite tack film provides enhanced flexural fatigue resistance compared to conventionally available tack films.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Item 1. A composite tack film comprising a) a first polymer layer comprising a thermally conductive polymer having a melting temperature of less than about 100° C.; b) a second polymer layer adjacent the first polymer layer, the second polymer layer comprising a visco-elastic, thermally conductive polymer having a melting temperature of less than about 110° C.; and c) a third polymer layer adjacent the second polymer layer, the third polymer layer comprising a thermally insulative polymer having a melting temperature of less than about 100° C.

Item 2. The composite tack film of Item 1, wherein the first polymer layer comprises an ethylene vinyl acetate copolymer and a filler.

Item 3. The composite tack film of Item 2, wherein the ethylene vinyl acetate copolymer has a vinyl acetate content of about 10% by weight to about 40% by weight, based on the total weight of the ethylene vinyl acetate copolymer.

Item 4. The composite tack film of Item 2, wherein the filler is calcium carbonate, talc, an inorganic particle with a metal coating, carbon black, or combination thereof.

Item 5. The composite tack film of Item 2, wherein the filler is present at up to about 40% by weight, based on the total weight of the first polymer layer.

Item 6. The composite tack film of Item 1, wherein the second polymer layer comprises a polymer blend of an ethylene vinyl acetate copolymer and a polyolefin with a filler.

Item 7. The composite tack film of Item 6, wherein the ethylene vinyl acetate copolymer has a vinyl acetate content of about 15% by weight to about 30% by weight, based on the total weight of the ethylene vinyl acetate copolymer.

Item 8. The composite tack film of Item 6, wherein the polyolefin has a melting temperature of less than about 120° C.

Item 9. The composite tack film of Item 8, wherein the polyolefin is low density polyethylene (LDPE), linear low density polyethylene (LLDPE), or blends thereof.

Item 10. The composite tack film of Item 6, wherein the filler is calcium carbonate, talc, an inorganic particle with a metal coating, carbon black, or combination thereof.

Item 11. The composite tack film of Item 6, wherein the filler is present at up to about 40% by weight, based on the total weight of the second polymer layer and wherein the polyolefin is present from about 30% by weight to about 60% by weight, based on the total weight of the second polymer layer.

Item 12. The composite tack film of Item 1, wherein the third polymer layer is an ethylene vinyl acetate copolymer.

Item 13. The composite tack film of Item 12, wherein the ethylene vinyl acetate copolymer has a vinyl acetate content of about 10% by weight to about 40% by weight, based on the total weight of the ethylene vinyl acetate copolymer.

Item 14. The composite tack film of Item 1, wherein the third polymer layer is substantially free of a filler.

Item 15. The composite tack film of Item 1, wherein the first polymer layer has a thickness of about 0.5 mil to about 2.0 mil.

Item 16. The composite tack film of Item 1, wherein the second polymer layer has a thickness of about 0.5 mil to about 2.0 mil.

Item 17. The composite tack film of Item 1, wherein the third polymer layer has a thickness of about 0.5 mil to about 2.0 mil.

Item 18. The composite tack film of Item 1, further comprising a release liner, a release coating, or combination thereof on a major surface of the first polymer layer.

Item 19. The composite tack film of Item 1, having an adhesive bond to asphaltic paving.

Item 20. The composite tack film of Item 19, having a shear strength of at least about 1 kN.

Item 21. The composite tack film of Item 1, having an activation temperature of less than about 300° F. when applied to asphaltic paving.

Item 22. The composite tack film of Item 21, having an activation temperature of about 250° F. to about 285° F. when applied to asphaltic paving.

Item 23. A method of reinforcing paving comprising providing a reinforcing grid over a lower layer of paving; applying a composite tack coating over the reinforcing grid, wherein the composite tack coating comprises a) a first polymer layer comprising a thermally conductive polymer having a melting temperature of less than about 100° C.; b) a second polymer layer adjacent the first polymer layer, the second polymer layer comprising a visco-elastic, thermally conductive polymer having a melting temperature of less than about 110° C.; and c) a third polymer layer adjacent the second polymer layer, the third polymer layer comprising a thermally insulative polymer having a melting temperature of less than about 100° C.; and applying an upper layer of paving on the first polymer layer of the composite tack film.

Item 24. The method of Item 23, wherein applying the second layer of paving activates the composite tack film at a temperature of less than about 300° F.

Item 25. The method of Item 24, wherein the composite tack film is activated at a temperature of about 250° F. to about 285° F.

Item 26. The method of Item 23, wherein the first polymer layer comprises an ethylene vinyl acetate copolymer and a filler.

Item 27. The method of Item 26, wherein the ethylene vinyl acetate copolymer has a vinyl acetate content of about 10% by weight to about 40% by weight, based on the total weight of the ethylene vinyl acetate copolymer.

Item 28. The method of Item 26, wherein the filler is calcium carbonate, talc, an inorganic particle with a metal coating, carbon black, or combination thereof.

Item 29. The method of Item 26, wherein the filler is present at up to about 40% by weight, based on the total weight of the first polymer layer.

Item 30. The method of Item 23, wherein the second polymer layer comprises a polymer blend of an ethylene vinyl acetate copolymer and a polyolefin with a filler.

Item 31. The method of Item 30, wherein the ethylene vinyl acetate copolymer has a vinyl acetate content of about 15% by weight to about 30% by weight, based on the total weight of the ethylene vinyl acetate copolymer.

Item 32. The method of Item 30, wherein the polyolefin has a melting temperature of less than about 120° C.

Item 33. The method of Item 32, wherein the polyolefin is low density polyethylene (LDPE), linear low density polyethylene (LLDPE), or blends thereof.

Item 34. The method of Item 30, wherein the filler is calcium carbonate, talc, an inorganic particle with a metal coating, carbon black, or combination thereof.

Item 35. The method of Item 30, wherein the filler is present at up to about 40% by weight, based on the total weight of the second polymer layer and wherein the polyolefin is present from about 30% by weight to about 60% by weight, based on the total weight of the second polymer layer.

Item 36. The method of Item 23, wherein the third polymer layer is an ethylene vinyl acetate copolymer.

Item 37. The method of Item 36, wherein the ethylene vinyl acetate copolymer has a vinyl acetate content of about 10% by weight to about 40% by weight, based on the total weight of the ethylene vinyl acetate copolymer.

Item 38. The method of Item 23, wherein the third polymer layer is substantially free of a filler.

Item 39. The method of Item 23, wherein the composite tack film forms an adhesive bond to the glass grid, the lower layer of paving and the upper layer of paving.

Item 40. The method of Item 39, having a shear strength of at least about 1 kN.

Item 41. The method of Item 23, wherein the reinforcing grid comprises fiberglass.

Item 42. The method of Item 41, wherein the fiberglass comprises a resinous coating.

Item 43. The method of Item 23, wherein the upper layer of paving is applied at a thickness of at least about 40 mm.

Item 44. The method of Item 23, wherein the lower layer of paving is disposed on an existing road surface.

Item 45. The method of Item 44, wherein the existing road surface comprises concrete, asphalt, or combination thereof.

The concepts described herein will be further described in the following examples, which do not limit the scope of the invention described in the claims. Some of the parameters below have been approximated for convenience.

EXAMPLES

A composite tack film is provided to better disclose and teach processes and compositions of the present invention. It is for illustrative purposes only, and it must be acknowledged that minor variations and changes can be made without materially affecting the spirit and scope of the invention as recited in the claims that follow.

Example 1

A composite tack film is made with first polymer layer and a third polymer layer of an ethylene vinyl acetate copolymer having a vinyl acetate content of 12% by weight of the total weight of the first polymer layer and the third polymer layer. The second polymer layer is a blend of a low density polyethylene (LDPE) and ethylene vinyl acetate (EVA) copolymer having an 18% by weight vinyl acetate content, based on the total weight of the ethylene vinyl acetate copolymer. A thermal analysis study is done with Differential Scanning calorimeter (DSC), measuring polymer material phase transition by tracking its associated thermal property change. Scanning rate is 10° C./min. As the crystalline polymer melts, it absorbs heat from the environment to enable this to happen. The LDPE shows peak melting of 107.8° C. and an EVA softening point of 85.2° C., actual melting point at 95.9° C. Clearly, the softening and melting point of the composite tack film provides a desirable stability over high temperature storage and shipping environment before the composite tack film is actually used in paving application.

Example 2

Figure 3:
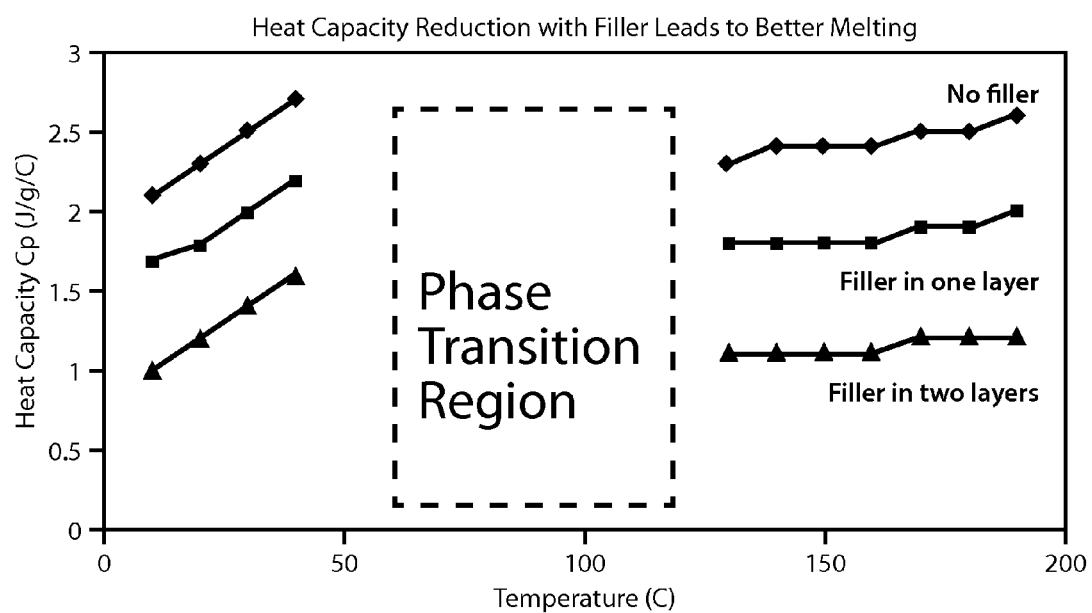
FIG. 3 includes a graphical illustration of an improved thermal conductivity of exemplary polymer layers with a thermally conductive filler.

Heat capacity is measured to demonstrate the advantage of the filler in the first polymer layer and the second polymer layer of an exemplary composite tack film. The composite tack film includes a filler of calcium carbonate with loaded polymer layers. The sample composite tack film has a first layer with 18% VA content EVA, and second layer with 50:50 by weight ratio of LDPE with $T_m$ of 108° C. and an EVA of 28% VA content, then a third layer of 18% EVA. This is the base film composition for various filler loading. Various filler loading conditions are measured, from no filler to one or two layers of filler, demonstrating the heat capacity change of the film. Heat capacity is the amount of heat required for the film to move up in temperature when it is being heated. A higher heat capacity will increase temperature more slowly, while filler loaded ones are faster to heat up with less heat capacity. Accordingly, for the same amount of heat coming from a hot asphalt mix on top of the film, a lower heat capacity will lead to a hotter film that is quicker to reach melting temperature. Unexpectedly, the addition of the filler provides thermal conductive properties to the composite tack film, which substantially improves the melt of the composite tack film. As seen in FIG. 3, two layers with filler are better than one layer. In particular, the filler provides the most improved thermally conductive properties with two layers.

The heat capacity study is done with DSC. The chart shows data in two regions with the region on the left being a composite tack film at its original unmelted state, and the region on the right being when it is melted to a molten material state. The region in between is when at least one of the materials involved (ethylene vinyl acetate copolymer or polyethylene) is going through phase transition like crystalline melt and thus heat capacity could not be accurately measured.

Example 3

A composite tack film is made with first polymer layer and a third polymer layer of an ethylene vinyl acetate copolymer having a vinyl acetate content of 18% by weight of the total weight of the first polymer layer and the third polymer layer. The second polymer layer is a blend of a low density polyethylene (LDPE) and ethylene vinyl acetate copolymer having a 28% by weight vinyl acetate content, based on the total weight of the ethylene vinyl acetate copolymer. Both the first polymer layer and the second polymer layer have a filler of calcium carbonate. The filler provides thermally conductive properties to the polymer.

Figure 4:
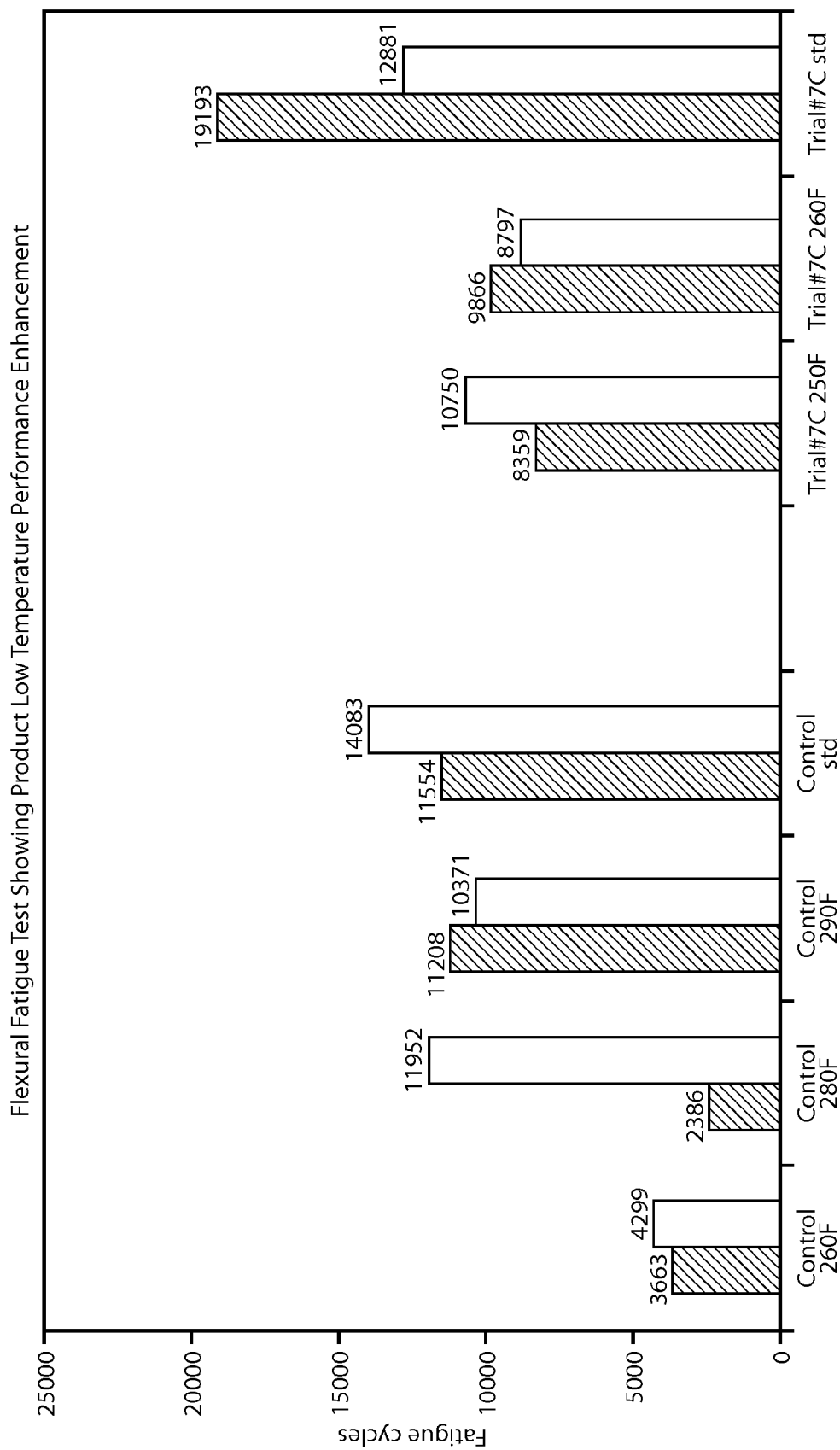
FIG. 4 includes a graphical illustration of fatigue cycles with a composite tack film in accordance with an embodiment described here.

FIG. 4 is the performance of the composite tack film compared to a control film having a tri-layer EVA/LDPE/EVA product construction available from Saint-Gobain ADFORS. In particular, the first layer is 100% ethylene vinyl acetate copolymer, the second layer is 100% LDPE, and the third layer is 100% ethylene vinyl acetate without any filler in the commercially available film. The LDPE shows peak melting of 124.8° C. and an EVA softening point of 76.4° C., actual melting point at 87.0° C. Flexural fatigue testing is used as a performance gauge in a lab accelerated testing to measure service life of the composite made with these materials. A dynamic 4 point bending test is used. Samples are fabricated using 2" of asphalt compaction with 12.5 mm size aggregate hot asphalt mix, compact to air void level of 8%+/−0.5%. The control product is laid on top of this asphalt compact at room temperature, then hot asphalt is compacted on top of this control product to simulate the road paving application compacting practice, with controlled compression pressure similar to road application, and with the hot asphalt at a controlled temperature as listed for each samples, from 250° F. to 300° F. as "std" stands for. The top asphalt layer is at 2" thickness. This resulting "sandwich" with control product interlayer simulates real life application conditions, and is subjected to stress controlled flexural fatigue testing. The four-point bending test is engaged and load is cycled on a test beam to simulate traffic conditions (traffic comes and goes) at 10 Hz frequency, sample size Height: 51.27 mm, Width: 64.05 mm, Length: 63.36, and normal load at nominal stress of 340 N applied with a sine wave function with amplitude of 40 N.

Two samples are tested here, with fatigue life listed on the top of the bar charts, unit is cycle, for each variable. The group to the left denoted as "Control" is the comparison tack film and glass reinforcing grid, showing poor value at low temperature of 260° F., and an inconsistent value at 280° F. The value at 280° F. indicates a borderline sample and depending on the level of melting, it behaves either like a well melted tack film or like a low asphalt temperature sample that could not melt the film well at all. At a temperature of 290° F. and 300° F. (std), the control is considered well melted.

The three samples on the right are the composite tack film of the Example in conjunction with a reinforcing glass grid. It shows improved fatigue resistance from 3000-4000 fatigue cycles to 8000-10000 fatigue cycles, approaching those of the control at its well melting stage (290° F. and above). At 300° F. (std), the composite tack film/glass grid is showing results in line with control at 300° F. or better. Clearly, the composite tack film of the present invention has improved low temperature performance of the film compared to conventionally available films, and allows this composite tack film to be used in applications with hot asphalt temperature as low as 250° F. and above, whereas the control has to be used with a hot asphalt mix of above 280° F.

An ethylene vinyl acetate copolymer is used with each polymer layer of the composite tack film. Although not to be bound by theory, a higher vinyl acetate content provides enhanced chemical affiliation, and thus improved adhesion, to asphalt with higher polarity compared to a lower vinyl acetate content ethylene vinyl acetate copolymer. Further, a higher vinyl acetate content provides a lower melting point temperature but increases the tackiness at lower temperatures, an undesirable feature for storage, shipping, and application. Accordingly, the vinyl acetate content is chosen for each layer to provide a balance between the adhesion to asphalt and the melt temperature. In a particular embodiment, the first polymer layer, the third polymer layer, or combination thereof have a lower vinyl acetate content so it is less tacky with a higher melting temperature compared to the second polymer layer, having a higher vinyl acetate content that has a lower melting temperature and is more tacky for better adhesion. In comparison to a commercially available and conventional tack film, the composite tack film with the first, second, and third polymer layers having the ethylene vinyl acetate copolymer component as described unexpectedly outperform the commercially available tack film for both low temperatures and high temperatures. This is clearly seen in FIG. 4 with an increase of fatigue cycles, indicating superior melting and adhesion, for the composite tack film over all temperature ranges compared to the conventionally available tack film.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite tack film comprising:
   a) a first polymer layer comprising a thermally conductive polymer having a melting temperature of less than about 100° C.;
   b) a second polymer layer adjacent the first polymer layer, the second polymer layer comprising a visco-elastic, thermally conductive polymer having a melting temperature of less than about 110° C.; and
   c) a third polymer layer adjacent the second polymer layer, the third polymer layer comprising a thermally insulative polymer having a melting temperature of less than about 100° C., wherein the third polymer layer is substantially free of a filler.

2. The composite tack film of claim 1, wherein the first polymer layer comprises an ethylene vinyl acetate copolymer and a filler.

3. The composite tack film of claim 2, wherein the ethylene vinyl acetate copolymer has a vinyl acetate content of about 10% by weight to about 40% by weight, based on the total weight of the ethylene vinyl acetate copolymer.

4. The composite tack film of claim 2, wherein the filler is calcium carbonate, talc, an inorganic particle with a metal coating, carbon black, or combination thereof.

5. The composite tack film of claim 1, wherein the second polymer layer comprises a polymer blend of an ethylene vinyl acetate copolymer and a polyolefin with a filler.

6. The composite tack film of claim 5, wherein the ethylene vinyl acetate copolymer has a vinyl acetate content of about 15% by weight to about 30% by weight, based on the total weight of the ethylene vinyl acetate copolymer.

7. The composite tack film of claim 5, wherein the polyolefin has a melting temperature of less than about 120° C.

8. The composite tack film of claim 7, wherein the polyolefin is low density polyethylene (LDPE), linear low density polyethylene (LLDPE), or blends thereof.

9. The composite tack film of claim 5, wherein the filler is calcium carbonate, talc, an inorganic particle with a metal coating, carbon black, or combination thereof.

10. The composite tack film of claim 1, wherein the third polymer layer is an ethylene vinyl acetate copolymer.

11. The composite tack film of claim 10, wherein the ethylene vinyl acetate copolymer has a vinyl acetate content of about 10% by weight to about 40% by weight, based on the total weight of the ethylene vinyl acetate copolymer.

12. The composite tack film of claim 1, further comprising a release liner, a release coating, or combination thereof on a major surface of the first polymer layer.

13. The composite tack film of claim 1, having an adhesive bond to asphaltic paving.

14. A method of reinforcing paving comprising:
provinding a reinforcing grid over a lower layer of paving;
applying a composite tack film over the reinforcing grid, wherein the composite tack film comprises:
- a) a first polymer layer comprising a thermally conductive polymer having a melting temperature of less than about 100° C.;
- b) a second polymer layer adjacent the first polymer layer, the second polymer layer comprising a viscoelastic, thermally conductive polymer having a melting temperature of less than about 110° C.; and
- c) a third polymer layer adjacent the second polymer layer, the third polymer layer comprising a thermally insulative polymer having a melting temperature of less than about 100° C., wherein the third polymer layer is substantially free of a filler; and applying an upper layer of paving on the first polymer layer of the composite tack film.

15. The method of claim 14, wherein applying the second layer of paving activates the composite tack film at a temperature of less than about 300° F.

16. The method of claim 14, wherein the first polymer layer comprises an ethylene vinyl acetate copolymer and a filler.

17. The method of claim 14, wherein the second polymer layer comprises a polymer blend of an ethylene vinyl acetate copolymer and a polyolefin with a filler.

18. The method of claim 14, wherein the third polymer layer is an ethylene vinyl acetate copolymer.

19. The method of claim 14, wherein the composite tack film forms an adhesive bond to the glass grid, the lower layer of paving and the upper layer of paving.

* * * * *